(12) United States Patent
Bollinger et al.

(10) Patent No.: US 7,870,149 B2
(45) Date of Patent: Jan. 11, 2011

(54) DATA MINING METHOD FOR FINDING DEVIATIONS IN DATA

(75) Inventors: Toni Bollinger, Weil der Stadt (DE); Ansgar Dorneich, Holzgerlingen (DE)

(73) Assignee: International Business Machines Corproation, Armonk, NY (US)

( * ) Notice: Subject to any disclaimer, the term of this patent is extended or adjusted under 35 U.S.C. 154(b) by 416 days.

(21) Appl. No.: 12/120,032

(22) Filed: May 13, 2008

(65) Prior Publication Data

US 2009/0019043 A1    Jan. 15, 2009

(30) Foreign Application Priority Data

Jul. 9, 2007    (EP)    ................................. 07112042

(51) Int. Cl.
*G06F 17/30* (2006.01)
*G06F 7/00* (2006.01)
(52) U.S. Cl. .................................................... 707/776
(58) Field of Classification Search ........................ None
See application file for complete search history.

(56) References Cited

U.S. PATENT DOCUMENTS 6,954,756 B2    10/2005    Arning et al.

OTHER PUBLICATIONS

Ayres, Jay, et al. "Sequential Pattern Mining Using a Bitmap Presentation." Proceedings of the ACM SIGKDD International Conference on Knowledge Discovery and Data Mining, 2002, pp. 429-435.
Agrawal, R. and R. Srikant. "Fast Algorithms for Mining Association Rules" .Proceedings of the 20th VLDB Conference, pp. 487-499. Santiago, Chile, 1994.

*Primary Examiner*—Kavita Padmanabhan
(74) *Attorney, Agent, or Firm*—Mollborn Patent, Inc.; Fredrik Mollburn (57) ABSTRACT

Methods and apparatus, including computer program products, implementing and using techniques for finding deviations in data. A set of candidate patterns is generated. A set of exception patterns that occur in the data less frequently than expected assuming statistical independence is selected from the set of candidate patterns. Data records that comply with at least one of the exception patterns are processed as exception candidates.

11 Claims, 5 Drawing Sheets

DATA MINING METHOD FOR FINDING DEVIATIONS IN DATA

CROSS-REFERENCE TO RELATED APPLICATIONS

The present application claims benefit under 35 U.S.C. §119 of European Application No. EP07112042, filed Jul. 9, 2007, which is hereby incorporated herein in its entirety.

BACKGROUND

The present invention relates in general to data mining, and in particular to finding deviations in data.

Data mining refers in general to data-driven approaches for extracting information from input data. Other approaches for extracting information from input data are typically hypothesis-driven, where a set of hypotheses is proven true or false in view of the input data.

The amount of input data may be huge, and therefore data mining techniques typically need to consider how to effectively process large amounts of data. Consider manufacturing of products as an example. There, the input data may include various pieces of data relating to origin and features of components, processing of the components in a manufacturing plant, how the components have been assembled together. The aim of data mining in the context of manufacturing may be to resolve problems relating to quality analysis and quality assurance. Data mining may be used, for example, for root cause analysis, for early warning systems within the manufacture plant, and for reducing warranty claims. As a second example, consider various information technology systems. There, data mining may further be used for intrusion detection, system monitoring and problem analyses. Data mining has also various other uses, for example, in retail and services, where typical customer behavior can be analyzed, and in medicine and life sciences for finding causal relations in clinical studies.

Pattern detection is a data mining discipline, where the input data consists of sets of transactions and each transaction consists of a set of items. The transactions may additionally be ordered. The ordering may be based on time, but alternatively any ordering can be defined. For example, each transaction may have been given a sequence number. Association rules are patterns describing how items occur within transactions. Sequence rules, on the other hand, refer to a certain sequence of item sets in sequential transactions.

Consider a set of items $I=\{I_1, I_2, \ldots I_m\}$. Let D be a set of transactions, where each transaction T is a set of items belonging to I, $T \subseteq I$. A transaction T thus contains a set A of items in I if $A \subseteq T$. An association rule is an implication of the form $A \Rightarrow B$, where $A \subset I$, $B \subset I$, and $A \cap B = \emptyset$; A is called the body and B the head of the rule. The association rule $A \Rightarrow B$ holds true in the transaction set D with a confidence c, if c % of the transactions in D that contain A also contain B. In other words, the confidence c is the conditional probability $p(B|A)$, where $p(S)$ is the probability of finding S as a subset of a transaction T in D. The rule $A \Rightarrow B$ has support s in the transaction set D, when s % of the transactions in D contain $A \cup B$. In other words, the support s is the probability of the union of items in set A and in set B occurring in a transaction.

The aim in data mining is in general to accurately find all association rules and sequence rules meeting user defined criteria. Often the user defines a minimum support or confidence for the rules, as very rare or loosely correlated events may not be of importance for some applications. The user may also be interested only in particular items and wants to search only for patterns containing at least one of these interesting items.

In some cases, however, it is important to find irregularities or deviations in input data. For example, finding irregularities or deviations is needed for cleansing data or for detection of unusual behavior which can be an indicator for fraud. Search for irregularities is typically based on finding regularities first, and then detecting deviations from the regularities. For example, patterns that have a very high confidence are interpreted as regularities. Data records that are not in accordance with the high confidence patterns are then interpreted as exceptions. A further example of finding irregularities is disclosed in the U.S. Pat. No. 6,954,756 where a known technique for generating classification trees is used. A classification tree and underlying classification rules are generated, for example based on training data. The data to be analyzed is then classified into using the classification tree. A purity value is a measure of the degree of conformity of all records associated with a leaf node (certain class). Records associated with a leaf node that has high purity but not in accordance with the underlying classification rule are the interpreted as exceptions.

Validation of candidate patterns against the input data is very resource intensive. In both examples above, a minimum threshold for confidence or purity is needed for limiting the number of pattern candidates among which the high confidence/purity patterns are searched for, in order to limit the amount of computing resources and/or time needed for the calculations. It is thus not possible to find exceptions to patterns whose confidence/purity is not above the threshold. Furthermore, exceptions to patterns with disjunctive rule heads cannot be tracked using the above methods based on high purity/confidence. Disjunctive rule head means that a disjunction of several items appears on the right hand side, e.g. $A \Rightarrow (B1$ or $B2$ or $B3)$.

The existing methods for finding deviations or irregularities thus cannot detect all possible deviations or irregularities. Thus, it would be desirable to provide improved mechanisms for efficiently detecting irregularities in data.

SUMMARY OF THE INVENTION

In general, in one aspect, the invention provides methods and apparatus, including computer program products, implementing and using techniques for finding deviations in data. A set of candidate patterns is generated. A set of exception patterns that occur in the data less frequently than expected assuming statistical independence is selected from the set of candidate patterns. Data records that comply with at least one of the exception patterns are processed as exception candidates.

The details of one or more embodiments of the invention are set forth in the accompanying drawings and the description below. Other features and advantages of the invention will be apparent from the description and drawings, and from the claims.

BRIEF DESCRIPTION OF THE DRAWINGS

Like reference symbols in the various drawings indicate like elements.

DETAILED DESCRIPTION OF EMBODIMENTS OF THE INVENTION

In the following, data mining by determining patterns in input data is discussed. In the following description, the term "pattern" refers to association rules and/or to sequence rules.

Figure 1:
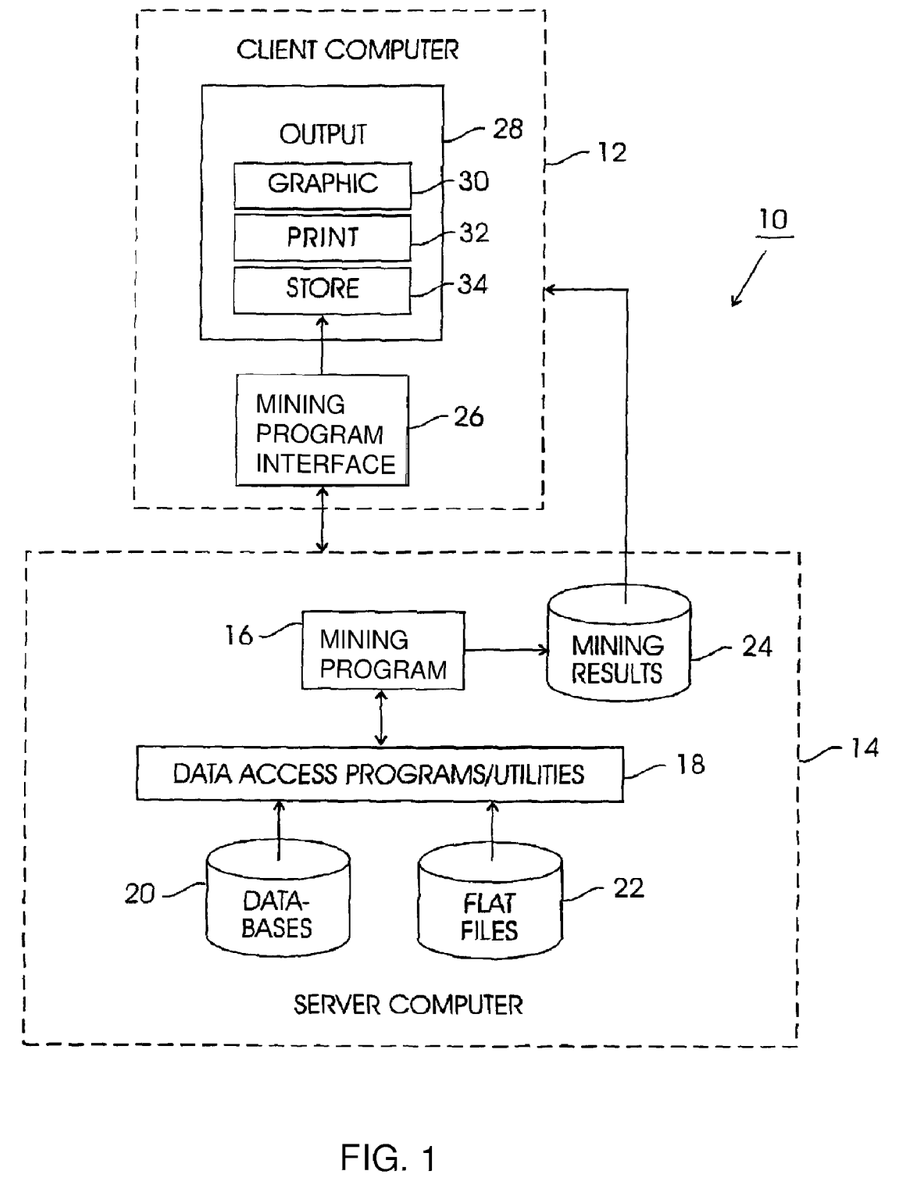
FIG. 1 shows schematically a computing system that can be used for data mining in accordance with one embodiment of the invention.

FIG. 1 shows a computer system 10 which may be used for mining databases or other input data sources. In particular, the computer system 10 may be used for data mining and/or processing input data in accordance with embodiments of the present invention. In the particular computer architecture shown in FIG. 1, the system 10 may include one or more digital information processing apparatus, such as a client computer 12 and a server computer 14. The server computer may be a mainframe computer made by IBM Corp. of Armonk, N.Y., and use multitasking operating system as that sold under the trademark z/OS. The server computer 14 may alternatively be a UNIX computer, a Windows NT Server or an IBM RS/6000 workstation using the AIX operation system. The server computer 14 may include a database system, such as DB2 or ORACLE, or may have data in files on some other data storage medium. It is apparent that other architectures that mentioned above or shown in FIG. 1 may be used. For example, the functions of the client computer 12 may be incorporated to the server computer 14 and vice versa. The server computer 14 may be a cluster of server computers.

As shown, the operating system of the server computer 14 may host a data mining program/functionality 16 which may be executed by a processor within the server computer 14 as a series of computer-executable instructions. These computer-executable instructions may reside in the memory, for example, in the RAM (random access memory) of the server computer 14 or on the hard-disk of the server computer 14. Alternatively, the instructions may be contained in a data storage device with a computer readable medium, such as a magnetic computer diskette, an optical disk, or a device called a memory stick. The instructions may be provided in the form of a computer program product, typically embodied on a computer readable medium.

Figure 2:
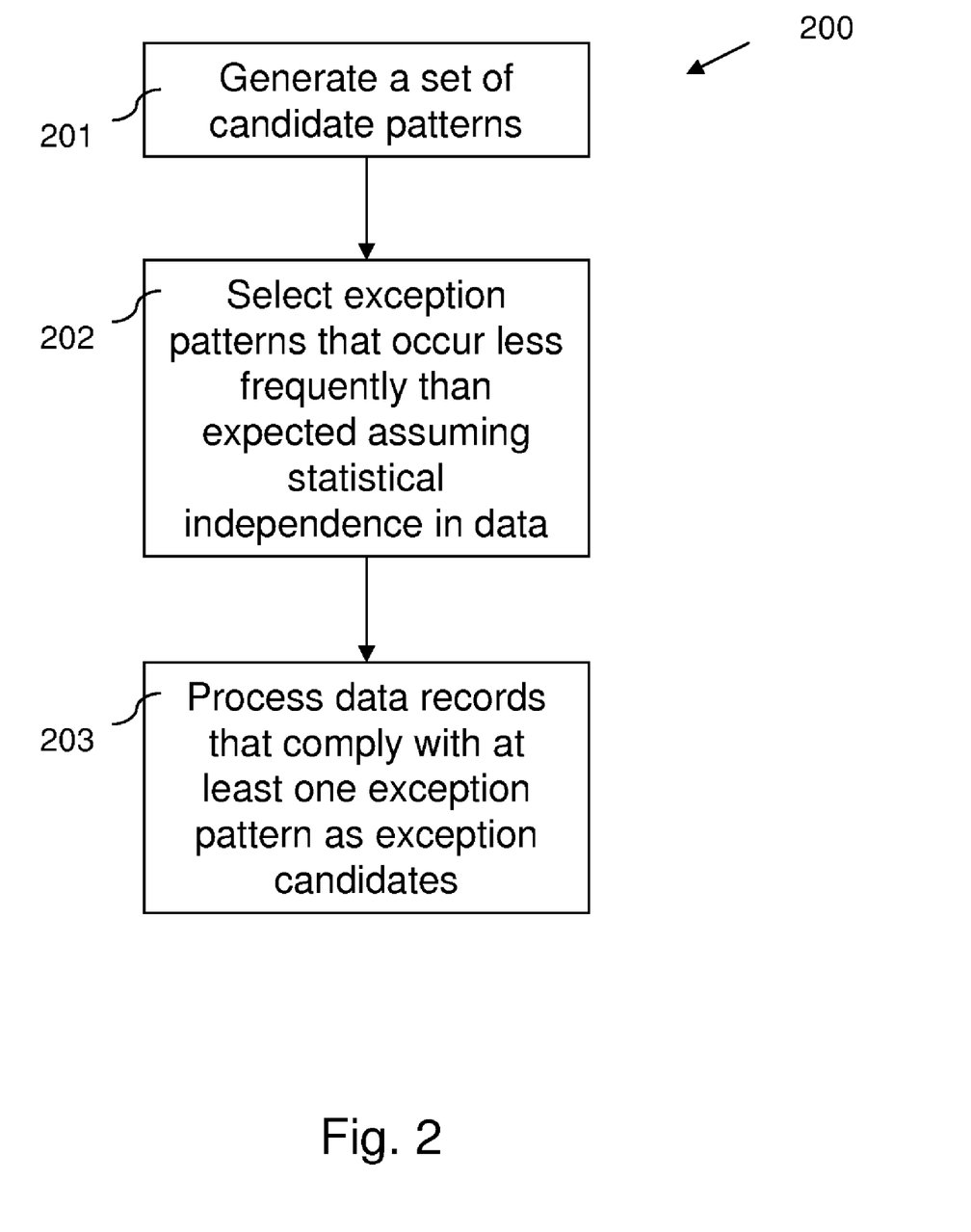
FIG. 2 shows a flowchart of a method for finding deviations in data in accordance with one embodiment of the invention.
Figure 3:
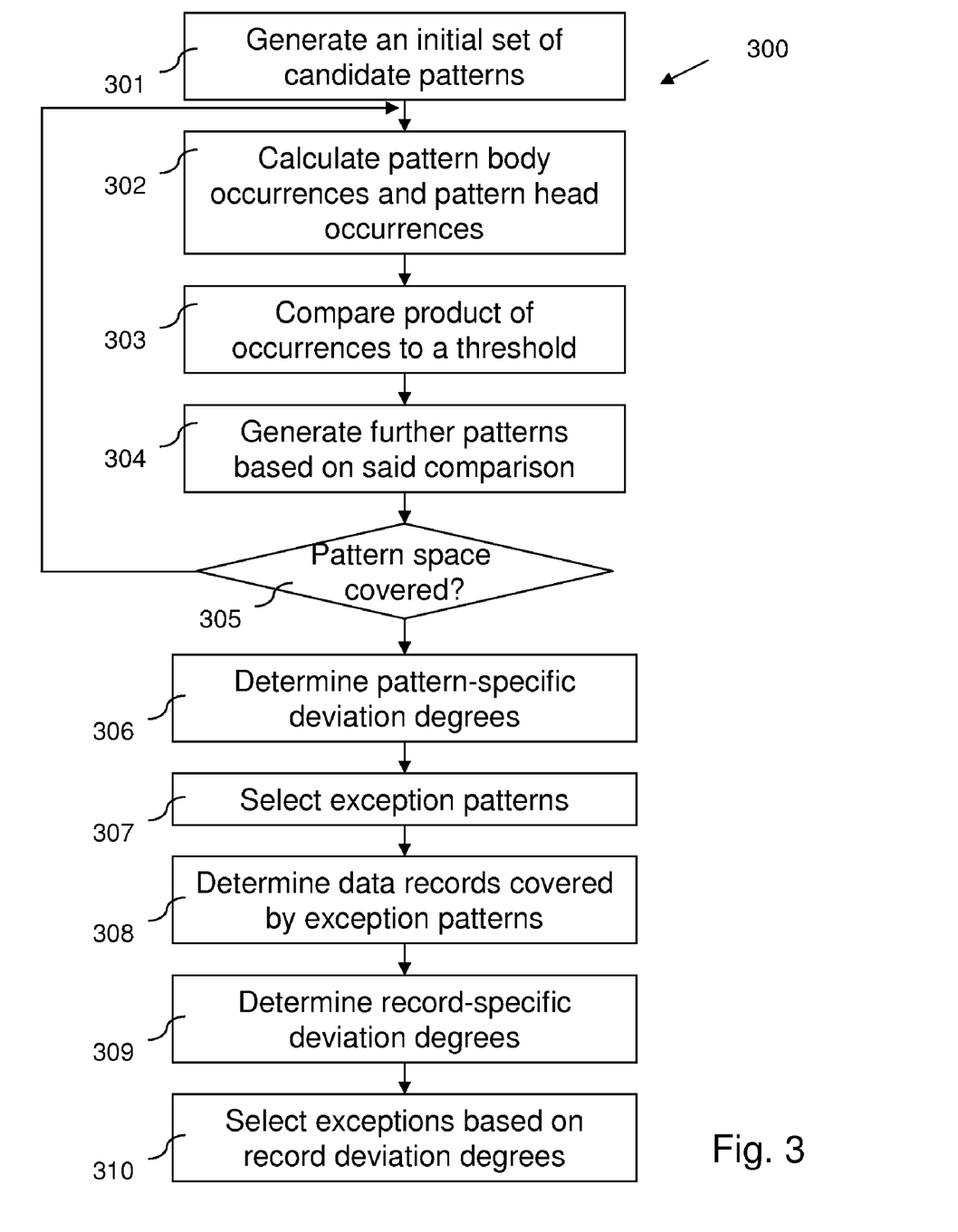
FIG. 3 shows a flowchart of a further method for finding deviations in data in accordance with one embodiment of the invention.
Figure 4:
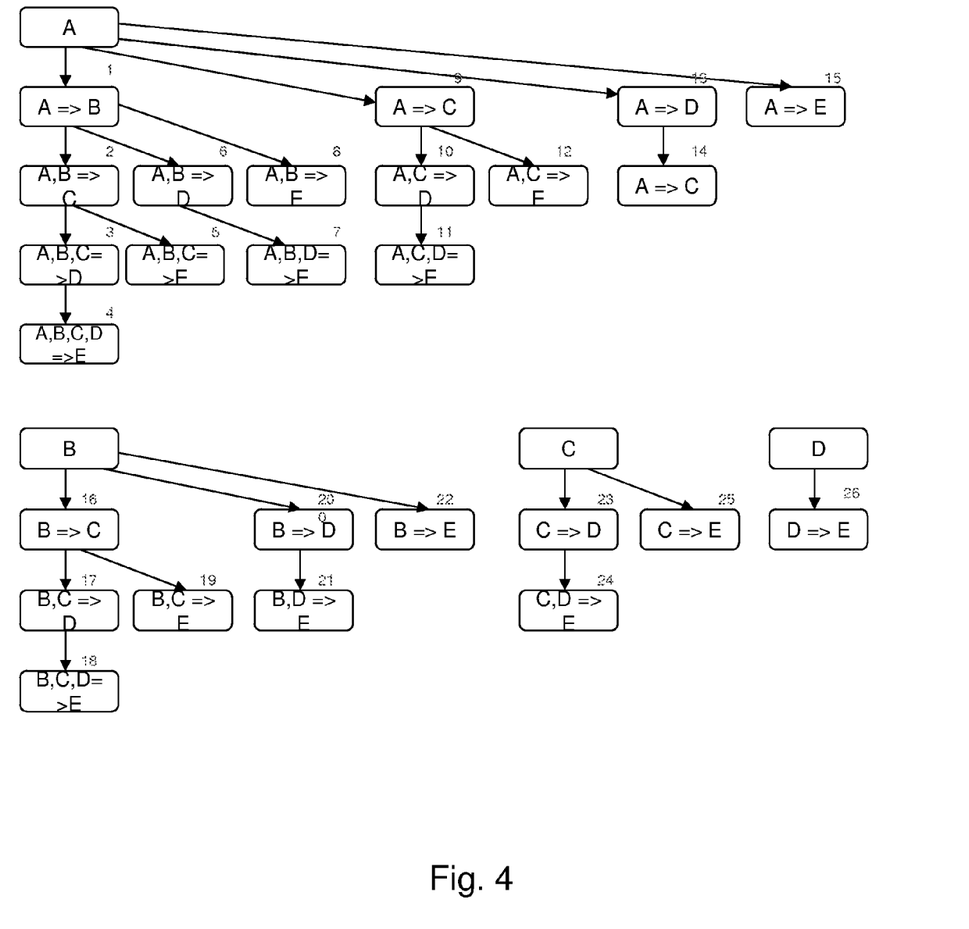
FIG. 4 shows a flowchart of a method for extending a parent pattern into child patterns in accordance with one embodiment of the invention.

FIGS. 2-4 relate to various functionalities applicable in data mining. Those skilled in the art appreciate that methods described with reference to these figures can be implemented in the data mining program 16. Alternatively, some features of the invention may be implemented in hardware. Also a suitable combination of software and hardware may be used for providing a device suitable to carry out a method in accordance with an embodiment of the present invention.

Returning back to FIG. 1, data access programs and utilities 18 typically enable the data mining program 16 to access one or more databases 20, and/or flat files (that is, text files) 22 which contain data about one or more transactions or other input data records. The input data may be compressed in some suitable manner. Alternatively, the data access programs and utilities 18 may retrieve the data from a remote database server not residing on the server computer 14, or the mining program 16 may be embedded in the database 20. The data mining program 16 typically outputs the found patterns, or at least those patters which are of interest to a user. The found patterns may be stored in the databases 20 or in a separate results repository 24, which may be accessed by the client computer 12.

As FIG. 1 shows, the client computer 12 may include a data mining interface 26 which, like the data mining program, may be implemented in suitable computer program code. Among other things, the interface functions as an input mechanism for specifying that deviations in the input data are to be searched for. Furthermore, the client computer 12 preferably includes an output module 28 for outputting/displaying the results stored in the results repository 24 on a graphical display 30, to a printing mechanism 32 or to a data storage medium 34.

In the following, functional features of the data mining program 16 are discussed in detail. Common notations and concepts in data mining are discussed first. Transactions as used as an example of data records, but it is appreciated that any data records containing sets of items can be used as input data.

Regarding the input data, there is a set of items I and a set D of transactions T as described above in connection with the related art. There are typically two nested grouping levels of these items. All items which occur simultaneously form a single transaction T (or, in other words, an item set). Typically, each transaction T has a unique transaction identifier TA_ID. The TA_ID identifier thus binds together items belonging to a single transaction T. Several transactions or item sets may form a transaction group, identified by an identifier TA_Group_ID. The TA_Group_ID thus binds together some transactions TA. If there is no temporal or other ordering of the transactions, then the second nesting to transaction groups is often missing.

An input data record for data mining thus typically contains a TA_ID or a record ID, one or more ITEM values, and an optional TA_Group_ID. As some examples, a TA_ID may represent the time of purchase in customer purchase analysis, date and time of a certain production step or failure, time of a certain web page click, or a distance from a starting point. As some examples of the TA_Group_ID, this identifier may represent a customer identifier in customer analysis, a product identifier in manufacturing and/or quality control, or a user identifier in web usage tracking. The ITEM fields may respectively represent, for example, purchased article identifiers, part or production step identifiers, or web page addresses.

It is furthermore possible that, in addition to the transactional input data, there is defined a taxonomy for the items. Taxonomy refers to additional levels of hierarchy. Taxonomy information states that certain items (taxonomy children) belong to certain item groups (taxonomy parents).

Certain properties of patterns are interesting in order to gauge their statistical or business importance. One specific class of patterns which is particularly relevant for practical problems and purposes are rule patterns. A rule is a predicate of type 'left hand side'. 'right hand side'. The left hand side is called the antecedent part or rule body, the right hand side is called the consequent part or rule head. The semantics of '. ' depends on the use case and the type of data which are available. When looking for associations between several items, facts or events, the meaning of '. ' is 'is associated with'. When looking for sequence rules, the meaning of '. ' is 'happens at a later time than'. Support s and confidence c of association rules have been defined in the section on related art above. In the following, the body of a rule is marked with b and the head of a rule is marked with h. The lift l of an association rule $\rho$: $b(\rho) \Rightarrow h(\rho)$ measures its statistical significance as the ratio of the confidence of the rule and the expected confidence e of the rule, which can be computed based on the assumption that the items occur statistically independent as $e(\rho)=s(h(\rho))$. So the lift l for an association rule is $l(\rho)=c(\rho)/s(h(\rho))$.

With the confidence being defined as the ratio of the rule support and the rule body support, i.e., $c(\rho)=s(\rho)/s(b(\rho))$, we get the following formula for the lift of a rule $\rho$: $l(\rho)=s(\rho)/(s(b(\rho))*s(h(\rho)))$. This means that the lift of a rule can be considered as well as the ratio of rule support and expected rule support based on the support values of rule head and body.

Support, confidence and lift can also be defined for sequence rules. The support value of a sequence rule $\sigma$ indicates the ratio between the number of transaction groups that support $\sigma$ and the total number of transaction groups. The confidence value of a sequence rule $\sigma$ is defined as the ratio between the number of transaction groups that support $\sigma$ entirely and the number of transaction groups that support the body of $\sigma$.

Finally, the lift of a sequence rule $\sigma$ is the ratio between the actual confidence of and its expected confidence $e(\sigma)$:

$l(\sigma)=c(\sigma)/e(\sigma)$. Under the assumption of statistical independence of sequence body and head, the expected support of a the sequence $\sigma$ is $s(b(\sigma))*s(h(\sigma))/2$. It is necessary to divide by 2 to take into account the order of body and head within the transaction groups. Only cases where the body occurs before the head in the transaction groups are relevant, whereas transaction groups with the inverse ordering of body and head do not count for the support. Therefore we get for the expected confidence of a sequence $\sigma$: $e(\sigma)=s(b(\sigma))*s(h(\sigma)/(s(b(\sigma))*2)=s(h(\sigma))/2$. With $c(\sigma)=s(\sigma)/s(b(\sigma))$ we get for the lift of the sequence $\sigma$: $l(\sigma)=s(\sigma)/(s(b(\sigma))*s(h(\sigma))*2)$. This means that for a sequence the lift is as well the ratio of the sequence support and the expected sequence support.

Embodiments of the invention address the problem of finding deviations in data. In contrast to looking for a high confidence/purity patterns and then finding deviation to these patterns, focus here in placed on patterns that are less frequent in the input data than expected based on the assumption of statistically independent events. Patterns that are less frequent than expected have a low lift, namely a lift value smaller than 1.

FIG. 2 shows a flowchart of a method 200 for finding deviations in data in accordance with one embodiment of the invention. In step 201, candidate patterns are generated. In principle, the candidate patterns can be generated using any known method. Typically, the generation of candidate patterns is done in phases. Some candidate patterns are first evaluated with respect to the input data. Those candidate patterns, which are found to be suitable, are then extended by adding new items to the patterns, resulting in further more complex candidate patterns. As the amount of input data may be huge and the patterns may be complex, there is typically need to organize efficiently the search through the candidate pattern space and evaluation of candidate patterns in view of the data. The existing techniques may be classified in two classes of algorithms based on the way these techniques proceed through the candidate pattern space. In principle, any existing technique of generating candidate patterns and searching through a pattern space may be employed. In connection with FIGS. 3 and 4 below, especially efficient pattern generation techniques are discussed.

The first class of pattern generation algorithms is the breath-first search. In these algorithms, the search through the candidate pattern space is started from simple patterns having two items. All two item patterns are first generated and evaluated with respect to the input data. Then all three item patterns are generated and evaluated with respect to the input data. Typically each candidate pattern is evaluated against the input data transactions. Unevaluated candidate patterns are typically stored in memory. The input data, on the other hand, is typically not stored in the memory but it is read from the data source. An example of breadth-first search can be found in "Fast Algorithms for Mining Association Rules" by Rakesh Agrawal and Ramakrishnan Srikant, Proc. 20th Int. Conf. Very Large Data Bases (VLDB), 1994.

The second class of algorithms is the depth-first search. In these algorithms, sets of candidate patterns are evaluated by starting from a first seed candidate pattern and evaluating all its siblings before turning to the other candidate patterns. As an example of a depth-first search algorithm, consider the algorithm described in "Sequential pattern mining using a bitmap presentation" by Jay Ayres et al., Proceedings of the ACM SIGKDD International Conference on Knowledge Discovery and Data Mining, 2002, pp. 429-435. In this algorithm, the input data is converted into binary format and stored in memory. Active-data-record histories, which are used to maintain information about which data records (transactions) are relevant for a certain pattern, are also kept in the memory.

In step 202, which may occur either after step 201 or interleaved with step 201, patterns that occur less frequently than expected assuming statistical independence of events are selected as exception patterns. As a typical selection criterion, patterns whose lift is smaller than 1 are selected as exception patterns. It is possible to handle all patterns whose lift is less than 1 as exception patterns. Another option is to specify an upper limit Lmax for the lift values, this upper limit being less than 1. A further option is to handle as exception patterns those Nmax patterns that have the lowest lift values. It is possible also to combine the above conditions, so that at maximum Nmax patterns having at lift value smaller than Lmax are selected as exception patterns. A user can control the output of the deviation detection algorithm with these criteria. It is appreciated that instead of lift values, it is possible to use, for example, the probability values for determining which pattern occur less frequently than expected.

In step 203, it is determined which data records comply with at least one of the exception patterns. These data records are then processed as exception candidates. They can be either all presented to the user and/or, for example, deviation degree values can be calculated for the exception candidates. The method discussed in connection with FIG. 3 provides more details on the values reflecting the deviation degree of a record.

A deviation degree refers here to any mathematical function which monotonously increases with decreasing lift, for example 1/lift, or 1-lift, or $(1-lift)^d$ with any exponent $d>=1$. Deviation degrees as defined here can serve as ranking criteria for patterns: the higher the deviation degree of a pattern $A \rightarrow B$, the more the conditional probability $p(B|A)$ is reduced compared to $p(B)$. As the examples above indicate, the lift of a pattern is a good basis for calculating the deviation degree values. For example, the inverse of a lift is a value for which the following applies: the larger the value, the smaller the actual probability that the pattern $A \rightarrow B$ occurs, compared to the expected probability when assuming statistically independent events A and B.

As an example of deviations that can be found using the approach suggested here, consider the following case. The input data here is a table with three columns (i.e. input data records have three items): AGE, MARITAL_STATUS and PROFESSION. The values of the numeric AGE column may have been discretized into buckets of width 10 (0-10, 20-, 20-30, . . . ). The values of MARITAL_STATUS may be {single, married, divorced, widowed}. Using the traditional approaches for finding deviations, a rule with very high confidence would first be looked for. In the present example, a rule with very high confidence (e.g. 99%) may be "AGE=0-10→PROFESSION=inactive". Exceptions to this rule would be persons with an age between 0 and 10 whose profession is not "inactive". These can be due to errors in the data (e.g. PROFESSION=executive) or rare cases where a profession for a child is valid (e.g. PROFESSION=artist for a child that has performed as an actor or a singer).

While the traditional approaches succeed in finding part of deviations, some types of deviations are not detected. Certain deviations can be missed if the threshold for minimum confidence is too high. For example, the rule "AGE=10-20→PROFESSION=inactive" may have a confidence of 80%. This rule does not apply to a teenager who has already finished school and has started working. However, the case of someone with AGE=10-20 and PROFESSION=executive would still need to be considered as an exception. This exception would not be found using the traditional approaches, since the confidence of rule "AGE=10-20→PROFESSION=inactive" may be below the "high confidence" threshold. The confidence of a rule is thus not always an appropriate indicator of the deviation degree for an exception. The approach taken here, namely searching directly for events that occur less frequently than expected, would find the pattern where a child is an executive.

A further example of exceptions that cannot be found using the traditional approaches are exceptions to rules with a disjunctive rule head. For example, a record with AGE=10-20 and MARITAL_STATUS=divorced would seem to be a deviation. The rule violated in this case is AGE=10-20→MARITAL_STATUS=(single or married). This deviation record is not discovered neither by the association rules nor the tree classification algorithm, but can be found using the approach suggested here. More generally speaking, the existing approaches only take into account the purities of patterns A ̲ B, but not the purities of expressions such as A ̲ (everything except B).

Returning to the details of the proposed approach, it is appreciated that an efficient search through the pattern space is needed for finding exception patterns, since the pattern space can be huge and, in contrast to the traditional approaches, there is no confidence/purity threshold for filtering the candidate patterns. It is noted that the criteria discussed below can be used in generating the candidate patterns. FIG. 3 shows a more detailed flowchart of a method 300, where the generation of candidate patterns is done in an efficient manner by using an appropriate criterion in connection with a depth-first search.

Since embodiments of the invention focus on patterns that occur infrequently, only patterns whose lift values is less than 1 are of interest here. As mentioned above, lift l of a pattern σ is the ratio between the actual support of σ and its expected support e(σ). Assuming statistical independence, the expected probability of a pattern is the product of the probabilities of the pattern body and pattern head: $p(b(\sigma))*p(h(\sigma))$. The expected support is thus $e(\sigma)=p(b(\sigma))*p(h(\sigma))*C$. Here, C is a correction factor which is 1 if the pattern is an association rule. If σ is a sequence rule, C is 0.5 because under the assumption of statistical independence only in 50% of all records which support both the body and the head of the pattern the time ordering between body and head is the desired one, namely body before head. The probabilities can be expressed using the support values, and $p(b(\sigma))*p(h(\sigma))=s(b(\sigma))*s(h(\sigma))$.

As 'deviation' criterion for the pattern σ we use the fact that its lift $l(\sigma)$ is smaller than a certain maximum threshold Lmax<1. The inversion of this inequality is $1/l(\sigma)=s(b(\sigma))*s(h(\sigma))/s(\sigma)>1/Lmax>1$.

Multiplying this by $s(\sigma)$, dividing by C and using the fact that $s(\sigma) \geq 1/N$ (otherwise σ would not at all occur in the data), we obtain a minimum threshold criterion for the product of the supports of body and head of the pattern: $s(b(\sigma))*s(h(\sigma)) > s(\sigma)/(C*Lmax) \geq 1/(C*N*Lmax)$ It is thus possible to limit the candidate pattern space in which the exception patterns are searched for. In other words, it is possible to control how candidate patterns are generated in step 201 or in method 300. A big advantage of the minimum threshold criterion is that it can be applied before any statistics concerning the pattern σ itself has to be collected. Only statistical properties of the shorter subpatterns $b(\sigma)$ and $h(\sigma)$ are needed. As most pattern detection algorithms create and evaluate patterns by means of a stepwise pattern expansion scheme, the statistics of $b(\sigma)$ and $h(\sigma)$ can be assumed to be available when the expansion algorithm has to decide whether σ is a potentially interesting deviation pattern which should be evaluated within the input data.

The disjunctive patterns are treated indirectly by the proposed approach. Instead of finding that the purity of AGE=10-20⇒MARITAL_STATUS=(single or married) is near 100%, we directly find that the lift of 'MARITAL_STATUS=divorced', which is equal to 'MARITAL_STATUS=(everything except single, married, or widowed)', is close to 0.

In the following text we describe how the threshold criterion can efficiently be applied within a depth-first pattern expansion scheme. The efficient application in a breadth-first pattern expansion scheme such as A-Priori is also possible.

In FIG. 3, an initial set of candidate patterns in generated in step 301 for depth-first search. In step 302, occurrences of the pattern body (support of the pattern body) and occurrences of the pattern head (support of the pattern head) in the input data are calculated. In step 303, the product of the occurrences is compared to an appropriate threshold, as discussed above. If the current pattern does not fulfill the criterion, it is not used as a parent pattern in generating further candidate patterns in step 304. In step 305 it is checked whether the whole pattern space has already been covered, and if not, the method continues with a parent pattern that fulfils the criterion but has not yet been expanded in step 302.

FIG. 4 discusses the generation of candidate patterns in more detail with the help of an example. Similarly to FIG. 3, also FIG. 4 addresses the depth-first pattern generation. The aim of the filtering criterion, where the product of the support values of the pattern body and pattern head are compared to an appropriate threshold, is to throw away as many candidate patterns as possible before the computationally expensive step of validating a candidate pattern against the input data takes place. The calculation of occurrences in step 302 in FIG. 3 is part of the validation.

FIG. 4 lists all 26 candidate patterns (association rules) that can be generated from five separate items (facts or events) A, B, C, D and E. The patterns are shown in blocks, where the arrows indicate the parent-child-relations of the patterns and the numbers above the blocks indicate the order of pattern generation in accordance with depth-first search starting from the atomic seed items A, B, C, D and E. In this example, it is assumed that all patterns that are looked for are orderless. In other words, the pattern A=>B is equivalent to B=>A. This is the case in association rules, but not in sequence rules. In this case, it is possible to restrict the generation of patterns to patterns where the alphabetic order of the involved events alphabetically grows from left to right. It is, however, appreciated that should the order of the items play a role, the filtering using the support criterion would still save validation efforts.

Even more efficient use of computing resources can be obtained by maintaining a stack of parent pattern candidates that have been already validated against the input data before generation of the current child candidate, together with validation information of the parent pattern candidates. For example, when the candidate pattern 4, namely {A, B, C, D}=>E, is generated, the parents A=>B, {A, B}=>C, and {A, B, C}=>D have been already validated. Support of item set {A, B} is known from validation of the candidate pattern 1, support of item set {A, B, C} is known from validation of the candidate pattern 2, etc. Furthermore, statistical properties of each item, especially the support of each single item, are assumed to be known. These items statistics can be calculated, for example, when preprocessing input data for the data mining algorithm. When the candidate pattern 4 has been generated, but before it is validated against the input data, it is possible to check whether the appropriate support criterion, e.g. support{A, B, C, D}*support{E}>1/(C*N*Lmax), is fulfilled. If the support criterion is not fulfilled, then candidate pattern 4 need not be validated, nor is there need to generate further candidate patterns based on pattern 4.

Returning to FIG. 3, it is next discussed how to determine which records are exceptions based on the found potential exception patterns (in other words, the patterns fulfilling the criterion s(b(ρ))*s(h(ρ))>1/(C*N*Lmax) or a similar criterion). Once the pattern space has been covered (step 305), pattern-specific deviation degree values are calculated in step 306 for the patterns that have been generated during steps 301 to 305. The pattern-specific deviation degree values may be the deviation degrees. In step 307, exception pattern are selected based on the pattern-specific deviation degree values. As discussed above, it is possible to handle all patterns, whose lift is less than one, as exceptions. As another option, it is possible to specify a criterion to the deviation degree value (or lift) that needs to be fulfilled before a pattern is treated as an exception pattern. As a further option, a fixed number of patterns having the highest deviation degree values (or the lowest lift values) may be treated as exception patterns.

In step 308, those input data records are determined that comply with the exception patterns. In step 309, record-specific deviation degree values are calculated, based on some or all pattern-specific deviation degree values of those patterns which the record supports. A record-specific deviation degree value may be, for example, a product of pattern-specific deviation degree values of those exception patterns that it complies with.

This approach, for example, works well for the deviation degree values. A geometric mean or an arithmetic mean are examples of other possibilities for calculating the record-specific deviation degree values. It is furthermore possible to use various norms to determine a deviation degree for a record based on the deviation degrees of the exception patterns the record supports. For example, using the maximum or infinity form can be implemented in the following way.

For each value field of an input data record, it is checked which exception patterns have a pattern head matching the value field. For each value field, only the exception pattern having the highest deviation degree value is maintained. The record-specific deviation degree value is then calculated based on the pattern-specific deviation degree values of the maintained exception patterns. The advantage of using the maximum/infinity norm is that the calculations are particularly fast and they do not require much memory. Another applicable norm is the 'discrete 1-norm', which just counts for each record how many deviation patterns the record supports. These two norms are the extreme cases (using only the 'worst' exception pattern versus using all exception patterns with identical weight factor). Between these two approaches there are infinitely many other ways of weighting the supported exception patterns. If needed, a default value for the record-specific deviation degree values may be specified.

In step 310, the exception records are selected based on the record-specific deviation degree values. For example, the records having deviation degree values exceeding a predefined threshold may be represented to the user as exceptions. As another example, a predefined number of records having the highest deviation degree values may be interpreted as exceptions.

Figure 5:
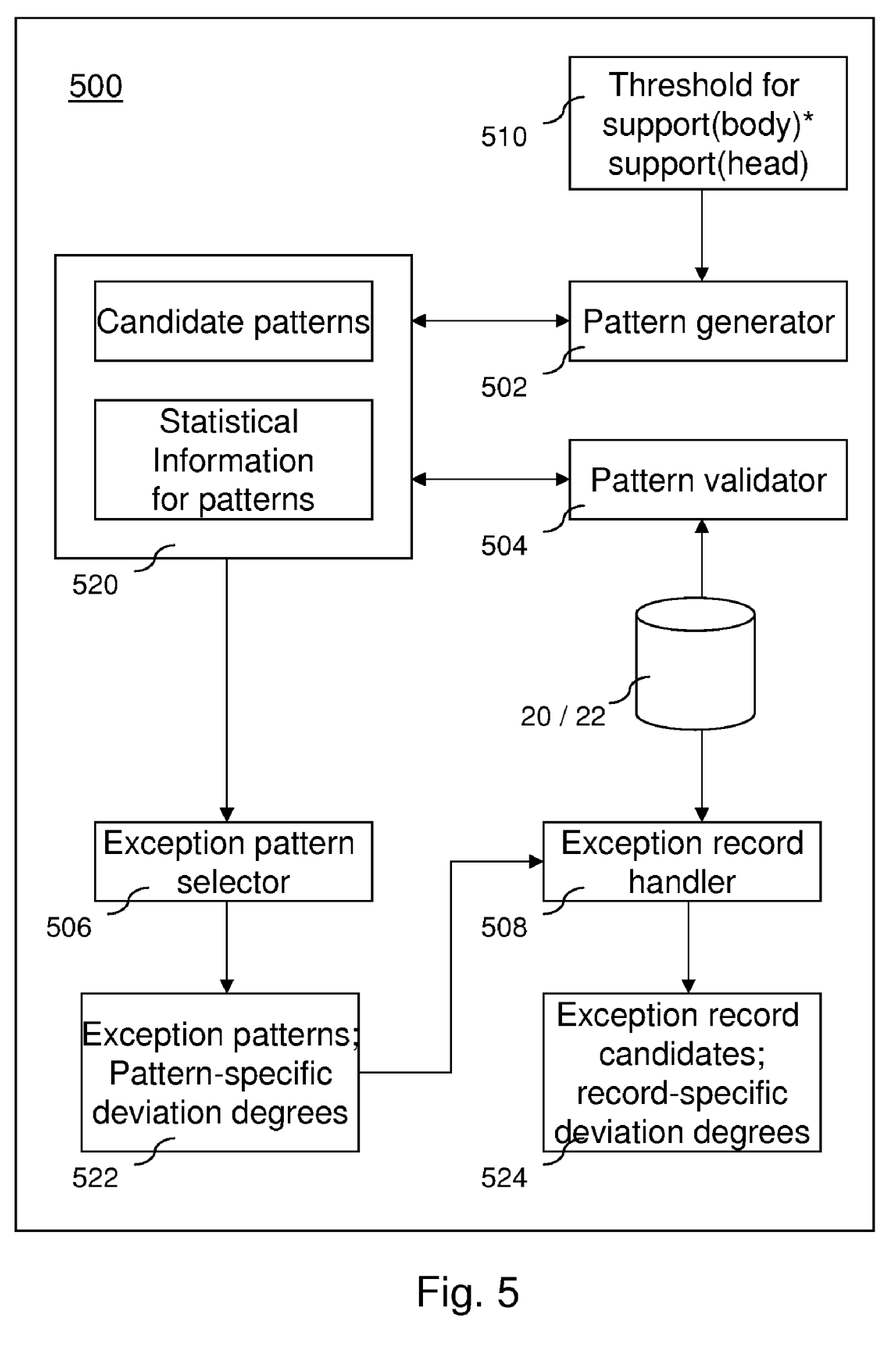
FIG. 5 shows a schematic diagram of a data processing system for data mining applications in accordance with one embodiment of the invention.

FIG. 5 shows a schematic diagram of a data processing system 500 for finding exception records in accordance with one embodiment. The data processing system 500 includes the following processing components: a pattern generator 502, a pattern validator 504, an exception pattern selector 506, and an exception record handler 508. These processing components may be provided, for example, as separate software components or, alternatively, as parts of one computer program. Implementation in hardware or using a suitable combination of specific hardware and software is also feasible. The pattern generator 502 generates candidate patterns using a threshold criterion 510 as discussed above. The pattern validator 504 validates the candidate patterns against the input data 20,22 and updates statistical information 520 about the candidate patterns. As discussed above, statistical information for all evaluated patterns (e.g. support values) is typically stored for further use. The exception pattern selector 506 uses the statistical information on the candidate patterns to select exception patterns 522. The exception pattern selector 506 also calculates the pattern-specific deviation degree values 522. The exception record handler 508 takes the exception patterns and their deviation degrees as input, and determines exception record candidates 524 which support at least one exception pattern 522. The exception record handler 508 calculates also the record-specific deviation degree values 524. The exception record handler 508 may also select the exception records based on the record-specific deviation degree values.

It is appreciated that the flowcharts and block diagrams show examples of possible implementations of the embodiments of the invention. The order of steps in the method may vary, and the functionalities of the components shown in FIG. 5 may be re-arranged.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution. Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters.

This description explicitly describes some combinations of the various features discussed herein. It is appreciated that various other combinations are evident to a skilled person studying this description.

In the appended claims a computer-implemented method refers to a method whose steps are performed by a computing system containing a suitable combination of one or more processors, memory means and storage means.

While the foregoing has been with reference to particular embodiments of the invention, it will be appreciated by those skilled in the art that changes in these embodiments may be made without departing from the principles and spirit of the invention, the scope of which is defined by the appended claims.

The invention claimed is:

1. A computer-implemented method for finding deviations in data, the method comprising:
   generating a set of candidate patterns;
   selecting from the set of candidate patterns a set of exception patterns that occur in the data less frequently than expected assuming statistical independence;
   processing data records that comply with at least one of the exception patterns as exception candidates;
   determining pattern-specific deviation degree values for the exception patterns;
   determining record-specific deviation degree values at least for the exception candidates based on the pattern-specific deviation degree values of exception patterns supported by respective exception candidates, wherein the pattern-specific deviation degree values are based on lift values of the respective exception patterns, the deviation degree values monotonously increasing with decreasing lift values; and
   selecting exceptions from the exception candidates based on the record-specific deviation degree values.

2. The method of claim 1, wherein each candidate pattern has a pattern body and a pattern head, the method further comprising:
   calculating the number of occurrences of the pattern body and the number of occurrences of the pattern head in the data for at least a first pattern candidate; and
   determining whether to generate further candidate patterns into the set from the first candidate pattern based on the number of occurrences of the pattern body and the number of occurrences of the pattern head.

3. The method of claim 2, further comprising:
   comparing a product of the number of occurrences of the pattern body and the number of occurrences of the pattern head to a threshold value; and
   determining whether to generate the further candidate patterns based on the comparison.

4. The method of claim 3, wherein the threshold value is based on at least one of:
   a number of data records, and a minimum lift value for the exception patterns.

5. The method of claim 1, wherein the record-specific deviation degree values are calculated using a function dependent on the pattern-specific deviation degree values of exception patterns supported by respective exception candidates.

6. A computer program product for finding deviations in data, the computer program product comprising:
   a computer usable storage medium having computer usable program code embodied therewith, the computer usable program code comprising:
   computer usable program code configured to generate a set of candidate patterns;
   computer usable program code configured to select from the set of candidate patterns a set of exception patterns that occur in the data less frequently than expected assuming statistical independence;
   computer usable program code configured to process data records that comply with at least one of the exception patterns as exception candidates;
   computer usable program code configured to determine pattern-specific deviation degree values for the exception patterns;
   computer usable program code configured to determine record-specific deviation degree values at least for the exception candidates based on the pattern-specific deviation degree values of exception patterns supported by respective exception candidates, wherein the pattern-specific deviation degree values are based on lift values of the respective exception patterns, the deviation degree values monotonously increasing with decreasing lift values; and
   computer usable program code configured to select exceptions from the exception candidates based on the record-specific deviation degree values.

7. The computer program product of claim 6, wherein each candidate pattern has a pattern body and a pattern head, further comprising:
   computer usable program code configured to calculate the number of occurrences of the pattern body and the number of occurrences of the pattern head in the data for at least a first pattern candidate; and
   computer usable program code configured to determine whether to generate further candidate patterns into the set from the first candidate pattern based on the number of occurrences of the pattern body and the number of occurrences of the pattern head.

8. The computer program product of claim 7, further comprising:
   computer usable program code configured to compare a product of the number of occurrences of the pattern body and the number of occurrences of the pattern head to a threshold value; and
   computer usable program code configured to determine whether to generate the further candidate patterns based on the comparison.

9. The computer program product of claim 8, wherein the threshold value is based on at least one of: a number of data records, and a minimum lift value for the exception patterns.

10. The computer program product of claim 6, wherein the record-specific deviation degree values are calculated using a function dependent on the pattern-specific deviation degree values of exception patterns supported by respective exception candidates.

11. A system for finding deviations in data, the system comprising:
   a processor, the processor executing a computer program comprising instructions for:
   generating a set of candidate patterns;
   selecting from the set of candidate patterns a set of exception patterns that occur in the data less frequently than expected assuming statistical independence;
   processing data records that comply with at least one of the exception patterns as exception candidates;
   determining pattern-specific deviation degree values for the exception patterns;
   determining record-specific deviation degree values at least for the exception candidates based on the pattern-specific deviation degree values of exception patterns supported by respective exception candidates, wherein the pattern-specific deviation degree values are based on lift values of the respective exception patterns, the deviation degree values monotonously increasing with decreasing lift values; and
   selecting exceptions from the exception candidates based on the record-specific deviation degree values.

* * * * *